(12) United States Patent
An et al.

(10) Patent No.: US 12,258,071 B2
(45) Date of Patent: *Mar. 25, 2025

(54) METHOD FOR MANUFACTURING LIGHTWEIGHT COWL CROSSBAR

(71) Applicants: HYUNDAI MOTOR COMPANY, Seoul (KR); KIA MOTORS CORPORATION, Seoul (KR); LG HAUSYS, LTD., Seoul (KR); HYUNDAI MOBIS CO., LTD., Seoul (KR)

(72) Inventors: Jae Hyun An, Seosan-si (KR); In Soo Han, Uiwang-si (KR); Hee Seok Kim, Yongin-si (KR); Il Sang Kim, Hwaseong-si (KR); Ik Jin Jung, Hwaseong-si (KR); Kyeong Hoon Jang, Seoul (KR); Young Jin You, Yongin-si (KR); Sang Hyeon Park, Seoul (KR); Wook Hee Lee, Seoul (KR); Yong Woo Jung, Seoul (KR); Ik Keun Choi, Yongin-si (KR); Young Chan Cho, Yongin-si (KR)

(73) Assignees: HYUNDAI MOTOR COMPANY, Seoul (KR); KIA MOTORS CORPORATION, Seoul (KR); LG HAUSYS, LTD., Seoul (KR); HYUNDAI MOBIS CO., LTD., Seoul (KR)

(*) Notice: Subject to any disclaimer, the term of this patent is extended or adjusted under 35 U.S.C. 154(b) by 856 days.

This patent is subject to a terminal disclaimer.

(21) Appl. No.: 17/129,265

(22) Filed: Dec. 21, 2020

(65) Prior Publication Data

US 2022/0009556 A1 Jan. 13, 2022

(30) Foreign Application Priority Data

Jul. 9, 2020 (KR) .................... 10-2020-0084666

(51) Int. Cl.
*B62D 25/08* (2006.01)
*B29C 48/00* (2019.01)
(Continued)

(52) U.S. Cl.
CPC ........ *B62D 25/081* (2013.01); *B29C 48/0021* (2019.02); *B29C 48/09* (2019.02);
(Continued)

(58) Field of Classification Search
None
See application file for complete search history.

(56) References Cited

U.S. PATENT DOCUMENTS 6,391,470 B1 * 5/2002 Schmieder ........... B62D 25/145
296/72
6,629,547 B1 10/2003 Yamaguchi
(Continued)

FOREIGN PATENT DOCUMENTS

| CN | 104690933 | * | 6/2015 |
| EP | 0585618 A1 | | 3/1994 |

(Continued)

*Primary Examiner* — Joseph D. Pape
(74) *Attorney, Agent, or Firm* — Lempia Summerfield Katz LLC

(57) ABSTRACT

A method for manufacturing a lightweight cowl crossbar includes: producing an inner pipe, laminating a plurality of composite material layers wound around the inner pipe, and extruding an outer pipe on the winding layer, in which the plurality of composite material layers adjacent to each other are wound in different directions.

5 Claims, 8 Drawing Sheets

(51) Int. Cl.
*B29C 48/09* (2019.01)
*B29C 48/88* (2019.01)
*B29C 70/22* (2006.01)
*B62D 29/04* (2006.01)
*B29K 23/00* (2006.01)
*B29L 31/30* (2006.01)

(52) U.S. Cl.
CPC ........ *B29C 48/9115* (2019.02); *B29C 70/222* (2013.01); *B62D 29/043* (2013.01); *B29K 2023/12* (2013.01); *B29L 2031/3055* (2013.01)

(56) References Cited

U.S. PATENT DOCUMENTS

| | | | | |
|---|---|---|---|---|
| 8,919,855 | B2* | 12/2014 | Ruiz | B62D 29/001 |
| | | | | 296/70 |
| 10,220,883 | B2* | 3/2019 | Nishimura | B62D 25/145 |
| 2004/0021250 | A1 | 2/2004 | Obeshaw | |
| 2012/0032044 | A1 | 2/2012 | Ruiz | |
| 2019/0016395 | A1* | 1/2019 | Kajikawa | B62D 1/16 |

FOREIGN PATENT DOCUMENTS

| | | | |
|---|---|---|---|
| FR | 2995582 A1 | | 3/2014 |
| JP | 2017178088 A | | 10/2017 |
| JP | 2019206982 | * | 12/2019 |
| JP | 2020-3010 | * | 1/2020 |
| KR | 10-2006-0005787 A | | 1/2006 |
| KR | 10-2018-0045649 A | | 5/2018 |
| KR | 10-2018-0083511 A | | 7/2018 |
| KR | 10-2020-0072731 A | | 6/2020 |
| WO | WO 2000022334 A1 | | 4/2000 |
| WO | WO 2004070248 A2 | | 8/2004 |

* cited by examiner 1.5t INNER SHELL EXTRUSION
(PP+GF50%)

0.5t +45 DEGREES WINDING
(CFT 0.25t TWO LAYERS)

0.5t −45 DEGREES WINDING
(CFT 0.25t TWO LAYERS)

0.5t +45 DEGREES WINDING
(CFT 0.25t TWO LAYERS)

METHOD FOR MANUFACTURING LIGHTWEIGHT COWL CROSSBAR

CROSS-REFERENCE TO RELATED APPLICATION

This application claims priority to and the benefit of Korean Patent Application No. 10-2020-0084666, filed on Jul. 9, 2020, the entire contents of which are incorporated herein by reference.

FIELD

The present disclosure relates to a method for manufacturing a lightweight cowl crossbar.

BACKGROUND

The statements in this section merely provide background information related to the present disclosure and may not constitute prior art.

Generally, a vehicle body of a vehicle is composed of side frames disposed on both sides thereof and several crossbeams connecting the side frames laterally.

Among them, a cowl crossbeam is a structure, which is installed horizontally on a vehicle interior side of the rear of a cowl panel, to give rigidity to the front of the vehicle body. The cowl crossbeam is designed in a rigid structure that can support a steering column and sufficiently absorb engine vibration transferred from the steering column.

A pair of support legs supporting the cowl crossbeam are coupled to the lower side of the center portion of the cowl crossbeam. The support leg serves to disperse the vibration from the steering device to the lower portion of the vehicle body. The support leg is installed with a connecting bar for increasing the lateral rigidity of the support leg.

Both sides of the cowl crossbeam are installed with side fastening parts for coupling to a side frame.

In addition, the cowl crossbeam is installed with various brackets for installing an instrument panel, an air conditioning duct, a sound device, a fuse box, an air bag, and the like.

Each of the support legs, the side fastening parts, and various brackets coupled to the cowl crossbeam is manufactured by press, extrusion, casting, and the like, and is then coupled to the cowl crossbeam through welding.

However, we have found that the structure of the cowl crossbar is desired to be changed according to the shape of a front slim cockpit of the vehicle based on the supply of an autonomous vehicle. In addition, in the case of a conventional internal combustion engine vehicle, we have discovered that the weight is increased by the configuration of an aluminum cowl crossbar to worsen fuel efficiency of the vehicle.

The above information disclosed in this Background section is only for enhancement of understanding of the background of the disclosure and accordingly it may contain information that does not form the prior art that is already known to a person of ordinary skill in the art.

SUMMARY

The present disclosure provides a method for manufacturing a cowl crossbar made of lightweight plastic and capable of providing stable rigidity.

In addition, the present disclosure provides a lightweight cowl crossbar through a method for manufacturing a cowl crossbar including a winding layer.

The objects of the present disclosure are not limited to the objects mentioned above, and other objects of the present disclosure which are not mentioned may be understood by the following description, and more clearly understood by examples of the present disclosure. In addition, the objects of the present disclosure may be realized by means of the claims and combinations thereof.

As an exemplary form of the present disclosure, the method for manufacturing the lightweight cowl crossbar includes producing an inner pipe; laminating a winding layer composed of a plurality of composite materials layers wound around the inner pipe; and extruding an outer pipe on the winding layer, in which the plurality of composite material layers adjacent to each other are wound in different directions.

In addition, the producing of the inner pipe further includes: extruding the inner pipe through an extrusion mold; and cooling the extruded inner pipe.

In addition, the producing of the outer pipe further includes: extruding the outer pipe on the upper surface of the winding layer through an extrusion mold; and cooling the extruded outer pipe.

In addition, the winding layer is composed of four different composite material layers.

In addition, the laminating of the winding layer further includes: laminating a first composite material layer located on the inner pipe and formed along a first direction; and laminating a second composite material layer located on the first composite material layer and formed along a second direction having a predetermined angle with respect to the first direction.

In addition, the laminating of the winding layer further includes: laminating a third composite material layer configured to have the same direction as the first direction on the second composite material layer; and laminating a fourth composite material layer configured to have the same direction as the second direction on the third composite material layer.

In addition, the laminating of the winding layers further includes: performing drawing after each of the composite material layers is laminated.

In addition, in the laminating of the winding layers, the composite material configuring the winding layer is made of a combination of polypropylene and a single-oriented fiber composite material.

Another exemplary form of the present disclosure includes: a first cowl crossbeam located on the side frame disposed on one side of the vehicle body; and a second cowl crossbeam fixed to the side frame disposed on the other side of the vehicle body; an inner pipe located inside the first cowl crossbeam or the second cowl crossbeam; a winding layer formed along the outer surface of the inner pipe; and an outer pipe located on the upper surface of the winding layer.

In addition, the winding layer is made of a single-oriented fiber composite material.

In addition, the winding layer is made of at least two single-oriented fibers having different angles.

In addition, the outer pipe of the second cowl crossbeam is configured to have a sawtooth shape, and the inner circumferential surface of the first cowl crossbeam has a shape corresponding to the sawtooth shape.

In addition, at least a part of the outer surface of the first cowl crossbeam includes a flat region.

The present disclosure provides the cowl crossbar made of a plastic material, and thus provides the lightweight cowl crossbar.

In addition, the present disclosure provides the lightweight cowl crossbar, which provides sufficient rigidity performance. The lightweight cowl crossbar includes the winding layer composed of the plurality of layers in order to increase the rigidity of the cowl crossbar made of a plastic material.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
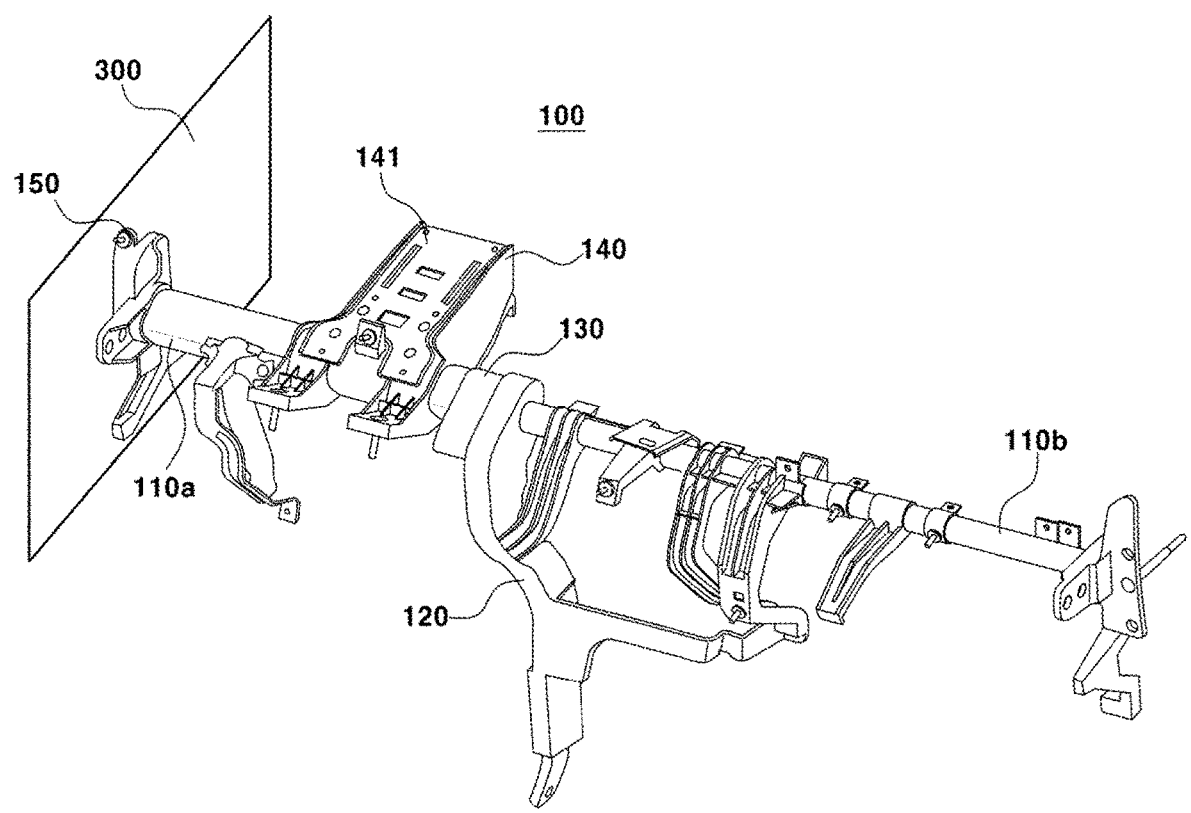
FIG. 1 is a diagram illustrating a configuration of a lightweight cowl crossbar, as an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various forms of the present disclosure will be described in more detail with reference to the accompanying drawings. The examples of the present disclosure may be modified in various forms, and the scope of the present disclosure should not be construed as being limited to the following exemplary forms. The present exemplary forms are provided to more fully describe the present disclosure to those skilled in the art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

In addition, terms such as " . . . part", " . . . beam", and " . . . " described in the specification mean a unit which processes at least one function or operation, which may be implemented by hardware or a combination of hardware.

In addition, in the present specification, the names of the components classified into 'first', 'second', or the like have the same relationship as each other and thus are classified with respect to the front of the vehicle, and the names of the components are not necessarily limited to the order in the following description.

In addition, although the specification has been described for an exemplary form composed of two cowl crossbeams in the present specification, the number of cowl crossbeams forming a cowl crossbar is not limited thereto.

A cowl crossbar 100 according to the present disclosure is made of a combination of polypropylene and glass fiber (GF) and includes at least two mold frames, and the cowl crossbar 100 is integrally formed through plastic injection molding.

A winding layer 112 surrounding the outside of an inner pipe 111 is made of a combination of polypropylene (PP) and a single-oriented fiber composite material (glass fiber), configured to form at least two composite material layers, and configured to be surrounded through an outer pipe 113.

Hereinafter, the composite material may be used to mean continuous fibers configuring a composite material layer of the winding layer.

In FIG. 1, the cowl crossbar 100 crosses both sides of a vehicle body, includes cowl crossbeams 110a, 110b having both ends connected to a side frame 300, and includes a side fastening part 150 configured so that the cowl crossbeams 110a, 110b and the side frames 300 are coupled to each other.

The center portion between the cowl crossbeams 110a, 110b includes a support leg 120 configured to be supported by the vehicle body of the vehicle. In one form, the support leg 120 is located on the second cowl crossbeam 110b, and the support leg 120 is configured to be fastened to the first cowl crossbeam 110a integrally with the second cowl crossbeam 110b. The support leg 120 may have different shapes depending on the shape of a cockpit of the vehicle.

In an exemplary form of the present disclosure, as the cowl crossbar 100 applied to a vehicle using a slim cockpit, the support leg 120 located on the center portion between the cowl crossbeams includes a constant curvature and is configured to be fixed to the vehicle body of the vehicle. The shape of the support leg 120 including the curvature may be applied to a vehicle including the shape of a cockpit applied to the vehicle or walk-through shapes of a driver seat and a passenger seat.

The cowl crossbar 100 according to the present disclosure may be configured by being integrally injected using a plastic material, manufactured by being divided into the first cowl crossbeam 110a and the second cowl crossbeam 110b, and fastened and fixed so that the second cowl crossbeam 110b overlaps at least a part of the first cowl crossbeam 110a.

In one form, the cowl crossbar 100 may be configured by molding a resin of which polypropylene and glass fiber are mixed.

The first cowl crossbeam 110a is composed of the inner pipe 111, the winding layer 112, and the outer pipe 113, and is configured so that the single-oriented fiber composite material forms at least one layer on the upper portion of the inner pipe 111. At least a partial surface of the outer pipe 113 is configured in a flat state, and the side fastening part 150 and the steering column fastening part 140 fastened to the first cowl crossbeam 110a made of a polypropylene (PP) material are configured to be bolt-fastened and fixed.

The first cowl crossbeam 110a includes the side fastening part 150 to be fastened to the side frame 300 of the vehicle body. The side fastening part 150 is configured to be fastened to one end of the first cowl crossbeam 110a, and may be configured to be fastened and fixed to an insert cap formed inside a hollow when the first cowl crossbeam 110a is extruded.

The cowl crossbar 100 includes the steering column fastening part 140 fastened to the flat surface of the first cowl crossbeam 110a. The steering column fastening part 140 is configured to be fixed to the flat surface located on the upper surface of the first cowl crossbeam 110a, and the outermost portion thereof is composed of a steel bracket 141.

The second cowl crossbeam 110b is configured to have the outer diameter smaller than the outer diameter of the inner pipe 111 of the first cowl crossbeam 110a, and configured so that at least a part of the second cowl crossbeam 110b may be inserted into and fixed to the first cowl crossbeam 110a with respect to the drawing block part 130.

In one form, at least a part of the support leg 120 located on one end of the second cowl crossbeam 110b is configured to be inserted into and fixed to the first cowl crossbeam 110a simultaneously with the second cowl crossbeam 110b.

One end of the second cowl crossbeam 110b inserted into the first cowl crossbeam 110a may be formed of a gear structure 114, and inserted into the first cowl crossbeam 110a, and in one form, at least a part of the support leg 120 may be configured to be formed of the gear structure 114 of the second cowl crossbeam 110b and inserted into the first cowl crossbeam 110a.

One surface of the support leg 120 includes a hollow part 121, and the hollow part 121 is configured to absorb shock if a passenger is in contact with the hollow part 121 due to the shock generated in the vehicle.

Moreover, the drawing block part 130 located adjacent to the support leg 120 includes an absorption member 131 capable of absorbing shock, and the absorption member 131 is made of expanded polypropylene (EPP) and configured to absorb the shock applied to the cowl crossbar 100.

The support leg 120 is configured to include an upper end fastened to the second cowl crossbeam 110b and a lower end fastened to the lower surface of the vehicle body. The lower end is fixed through at least one fastening groove located on the upper end.

In an exemplary form of the present disclosure, the fastening groove is composed of an upper fastening groove and a lower fastening groove, and configured so that the support rigidity of the lower fastening groove is lower than the support rigidity of the upper fastening groove in response to the vertical shock. Accordingly, the fastening groove is configured so that the lower fastening groove is first broken in response to the vertical shock applied to the cowl crossbar 100 and the support leg 120 and then the upper fastening groove is broken, thereby releasing the fastening between the upper end and the lower end. Accordingly, the support leg 120 is configured to absorb the shock applied in the vertical direction of the cowl crossbar 100.

In addition, an exemplary form of the present disclosure may form the support leg, the steering column fastening part 140, and the side fastening part, which may be formed by insert injection into the outer pipe 113. In addition, an exemplary form of the present disclosure may include a steel bracket as a reinforcement member for the support bracket, the steering column fastening part 140, the side fastening part, or the like, and the steel bracket is configured to serve to absorb shock and inhibit breakage. That is, an exemplary form of the present disclosure is configured to mold the lower components of the cowl crossbar through the insert injection into at least a part of the outer pipe 113.

Figure 2:
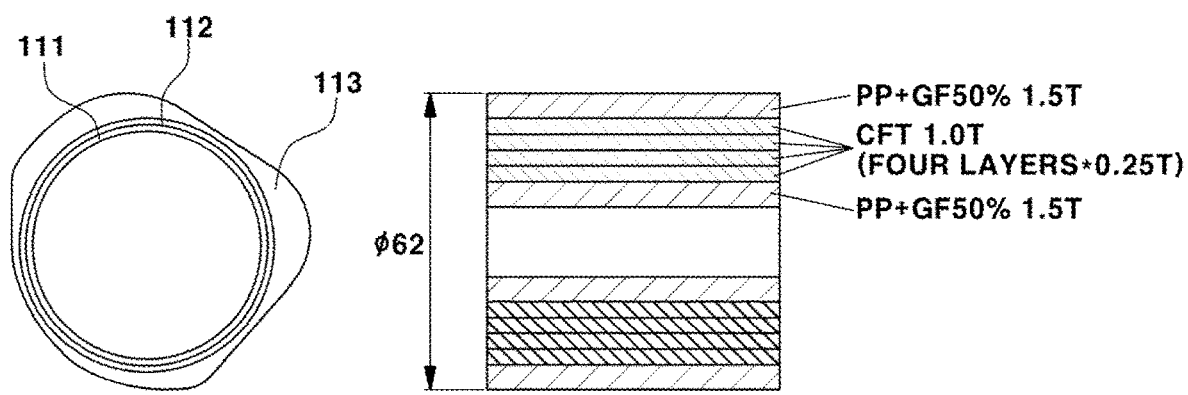
FIG. 2 is a cross-sectional diagram illustrating a first cowl crossbeam, as an exemplary form of the present disclosure.
Figure 3:
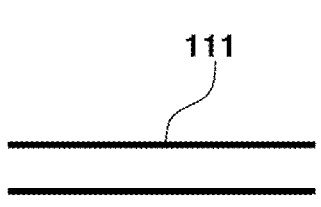
FIG. 3 is a diagram illustrating a method for forming a winding layer of the first cowl crossbeam, as an exemplary form of the present disclosure.
Figure 3:
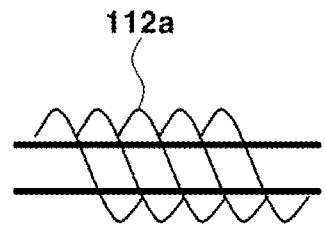
Figure 3:
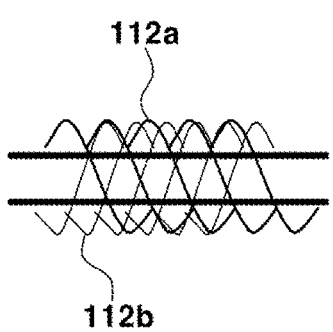
Figure 3:
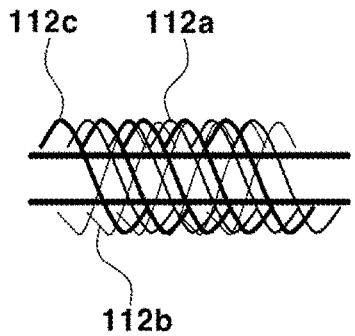

FIG. 2 is a cross-sectional diagram illustrating the first cowl crossbeam 110a, as an exemplary form of the present disclosure, and FIG. 3 illustrates a manufacturing method configuring the winding layer 112 made of three composite materials.

The first cowl crossbeam 110a is configured in a hollow shape by sequentially laminating the inner pipe 111, the winding layer 112, and the outer pipe 113. That is, the inner pipe 111 is configured to have a hollow circular cross-section, and includes the winding layer 112 made of at least one single-oriented fiber composite material wound around the outside of the inner pipe 111. In another form, the single-oriented fiber composite material according to the present disclosure may consist of continuous fiber thermoplastic (CFT).

In an exemplary form of the present disclosure, the winding layer 112 is made of three composite materials, and a first composite material layer 112a is first wound to have a slope of 45 degrees with respect to the inner pipe 111. The first composite material layer 112a may be made of two layers of single-oriented fibers. Thereafter, a second composite material layer 112b is configured to be located at an angle of 90 degrees with the first composite material layer wound first, and the second composite material layer 112b is made of two layers of single-oriented fibers. A third composite material layer 112c is wound around the upper surface of the second winding layer 112b to have the same angle as the first winding layer 112a. Each of the composite materials may be configured to have a thickness of 0.25 T. Another exemplary form of the present disclosure may configure the winding layer 112 including six composite material layers.

After each of the composite materials is wound, a heating planarization operation of the wound winding layer 112 is performed. In one form, the heating planarization operation may be performed after at least two composite materials are wound.

Since the outer pipe 113 is extruded after the winding layer 112 is formed, the outer pipe 113 may be made of a composite material of polypropylene and glass fiber. In one form, the inner pipe 111 and the outer pipe 113 may be made of the same material to be extruded.

As illustrated in FIG. 2, at least a part of the outer pipe 113 may be configured to include a flat surface, and in one form, the cross-sectional area of the outer pipe 113 may be located to include a region protruding to have vertices with different thickness. Accordingly, the support leg 120, the steering column fastening part 140, the side fastening part 150, and the like may be configured to be bolt-fastened to the flat surface of the first cowl crossbeam 110a located between different vertices.

Figure 4:
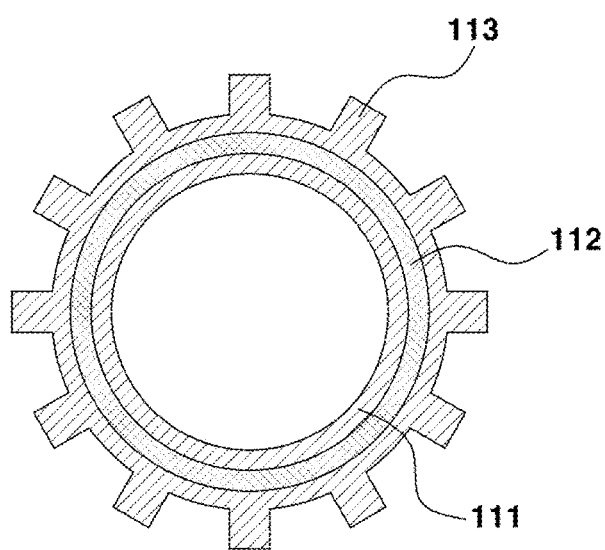
FIG. 4 is a side cross-sectional diagram illustrating a second cowl crossbeam, as an exemplary form of the present disclosure.

FIG. 4 illustrates a cross-section of the second cowl crossbeam 110b as an exemplary form of the present disclosure. Four composite material layers are included on the upper surface of the inner pipe 111, and the outer pipe 113 is formed on the upper surface of the winding layer through injection.

Moreover, if the outer shell material is injected through an extrusion mold 610 to mold the outer pipe 113, the shape of the outer pipe 113 is determined through the extrusion mold 610. In an exemplary form of the present disclosure, the outer pipe 113 is extruded so that the outside of the second cowl crossbeam 110b forms the gear structure including a plurality of protrusions, and the inner circumferential surface of the inner pipe 111 of the first cowl crossbeam 110a is configured to be extruded so that the second cowl crossbeam 110b is inserted into and fixed to the first cowl crossbeam 110a.

That is, since the shape of the inner circumferential surface of the inner pipe 111 of the first cowl crossbeam 110a is determined and the shape of the outer circumferential surface of the outer pipe 113 of the second cowl crossbeam 110b is determined according to the shape of the extrusion mold, the first cowl crossbeam 110a and the second cowl crossbeam 110b may be fastened and fixed so as not to be rotated mutually.

Figure 5:
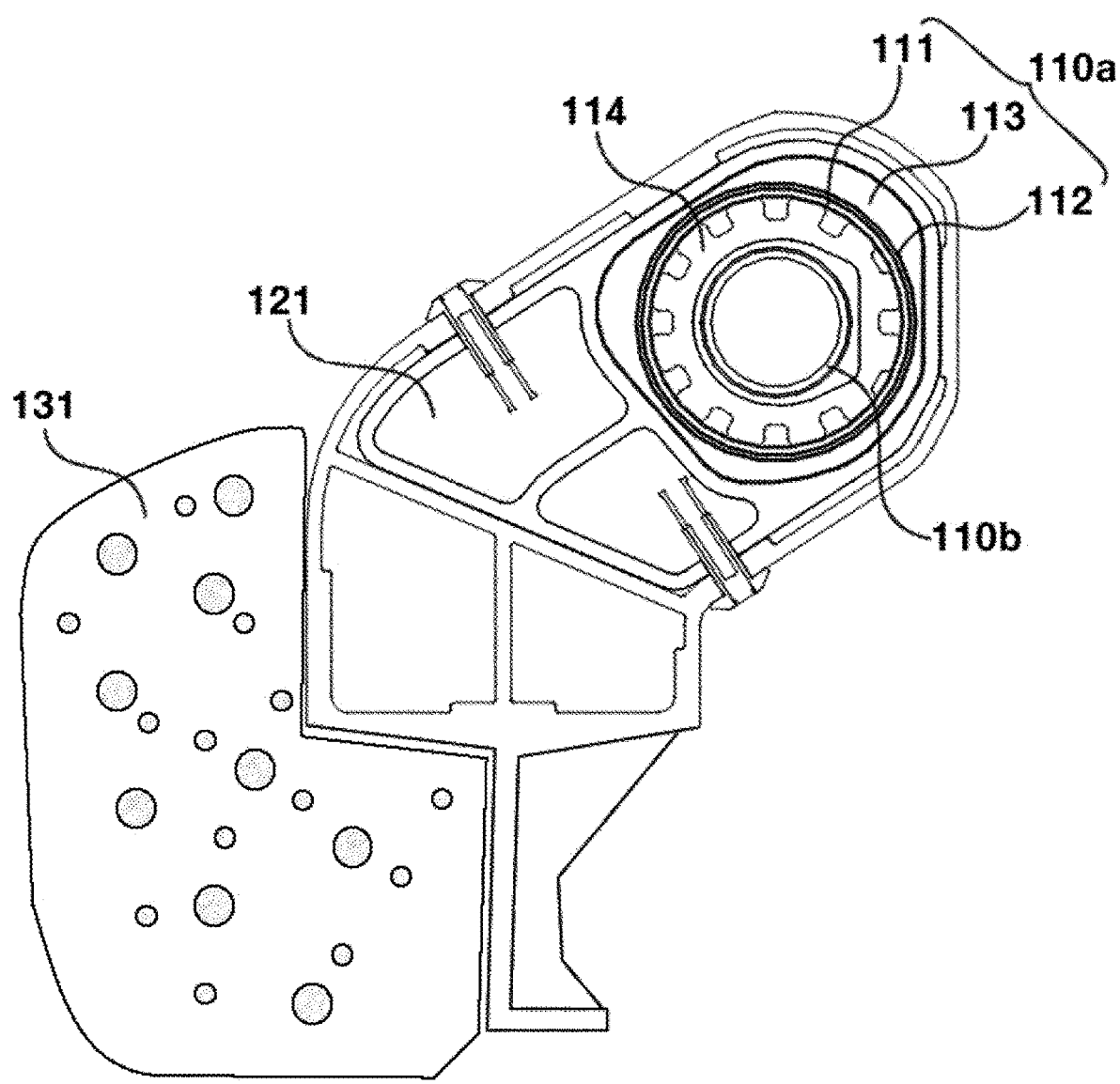
FIG. 5 is a side cross-sectional diagram illustrating a drawing block part, as an exemplary form of the present disclosure.

In FIG. 5, the first cowl crossbeam 110a and the second cowl crossbeam 110b are configured so that at least a part thereof is located to overlap each other. In one form, the gear structure 114 located on the outermost portion of the second cowl crossbeam 110b is integrally configured with the support leg 120, and the second cowl crossbeam 110b including the gear structure 114 and a part of the support leg 120 are configured to be inserted into and fixed to the first cowl crossbeam 110a.

In another form, since the outer pipe of the second cowl crossbeam 110b is configured to have a sawtooth shape, and the inner circumferential surface of the first cowl crossbeam 110a is configured to include a shape corresponding to the sawtooth shape, the outer pipe of the second cowl crossbeam 110b may be configured to be inserted into and fixed to the inner circumferential surface of the first cowl crossbeam 110a.

Moreover, since the outer pipe of the cowl crossbeam is configured to have a sawtooth shape, a configuration fastened to the outer surface of the outer pipe through insert injection is located on the sawtooth shape. Accordingly, the configuration fastened to the cowl crossbeam through insert injection may be inhibited from rotating due to shock.

The cowl crossbar 100 includes the drawing block part 130 configured to surround the outer pipe 113 of the first cowl crossbeam 110a in the region where the first cowl crossbeam 110a and the second cowl crossbeam 110b overlap each other. The drawing block part 130 is configured to surround the first cowl crossbeam 110a and the second cowl crossbeam 110b and configured to simultaneously surround at least a part of the support leg 120 located on the second cowl crossbeam 110b.

One side of the support leg 120 may include the hollow part 121, and include a hollow shape located in the drawing block part 130 corresponding to the hollow part 121, and one side of the drawing block part 130 includes the absorption member 131 configured to cushion shock.

The absorption member 131 may be located on one end on which the drawing block part 130 and the inside of the vehicle face each other, and serves to absorb the shock applied from the vehicle interior through the hollow part 121 and the absorption member 131 together with the hollow shape corresponding to the hollow part 121 for absorbing the shock.

In one form, since the cowl crossbar 100 provides the drawing block part 130 configured to surround at least a part of the upper end of the support leg 120, and may include an injection breakage part on the lower end of the support leg 120 facing the drawing block part 130, the cowl crossbar 100 is configured so that the first applied shock is absorbed through the hollow part 121, and the injection breakage part of the support leg 120 is broken if a predetermined shock amount or more is applied to the cowl crossbar 100.

As described above, the present disclosure includes a plurality of shock absorption structures and configurations so that the shock applied to the location where the first cowl crossbeam 110a and the second cowl crossbeam 110b face each other may be absorbed.

Figure 6:
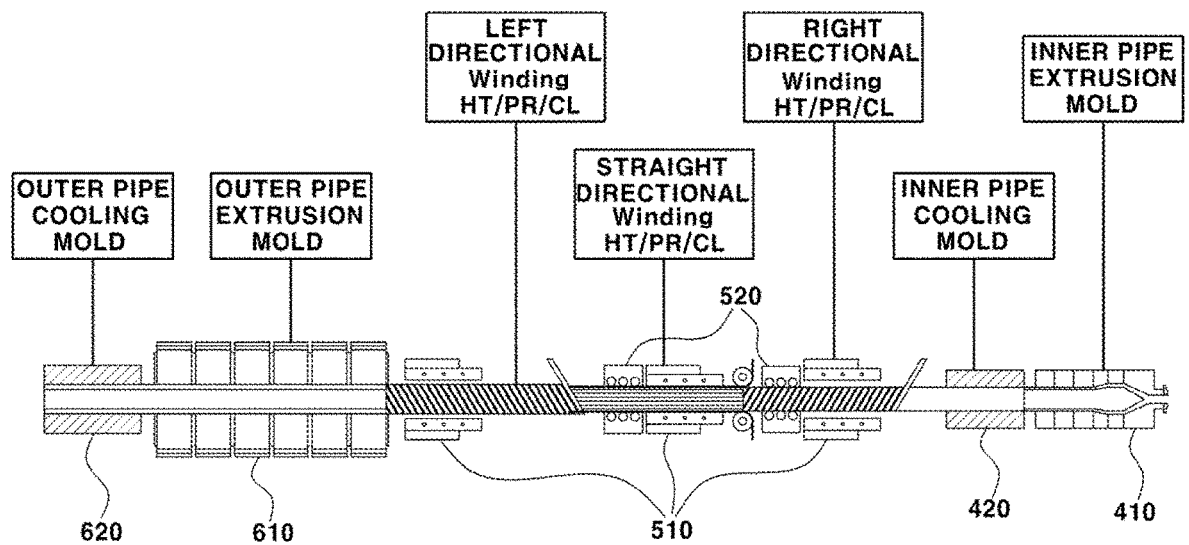
FIG. 6 is a diagram illustrating a configuration of a manufacturing apparatus for manufacturing the lightweight cowl crossbar, as an exemplary form of the present disclosure.

FIG. 6 illustrates a schematic diagram of a manufacturing apparatus for forming the lightweight cowl crossbar 100, as an exemplary form of the present disclosure.

As illustrated, the manufacturing apparatus includes an inner pipe extrusion mold 410 for first injecting the inner pipe 111. As the physical property of the inner pipe 111, a resin in which polypropylene and glass fibers of 50% are mixed is injected into one end of the inner pipe extrusion mold 410. The extruded inner pipe 111 is moved to a take-off machine 510 so that the glass fiber is wound around the inner pipe 111 after performing the step of cooling through a cooling mold 420.

In the take-off machine 510, the first composite material layer 112a is first wound around the inner pipe 111 so as to have a slope of 45 degrees (first direction) with respect to the inner pipe 111. The first composite material layer 112a may be composed of two layers of single-oriented fibers. Thereafter, the second composite material layer 112b is configured to be located to have an angle of 90 degrees (second direction) with the first composite material layer 112a first wound, and the second composite material layer 112b is composed of two layers of single-oriented fibers. The third composite material layer 112c is wound around the upper surface of the second composite material layer 112b to have the same angle as the first composite material layer 112a. Additionally, a fourth composite material layer 112d is wound to have the same angle as the second composite material layer 112b.

As described above, since an exemplary form of the present disclosure forms the winding layer 112 in which the composite materials composed of four layers are laminated through the take-off machine 510, an exemplary form of the present disclosure is configured to planarize an uneven section of the corresponding winding layer 112 and increase the adhesive force thereof through a drawing machine 520 after the each of the composite material layers (layer on which each of the composite materials is laminated) is formed.

In one form, at least one take-off machine 510 may be configured so that the composite material is laminated in a direction (first direction or second direction) corresponding to each layer. As described above, the present disclosure may set an angle at which each of the composite material layers is formed according to the location and angle of the take-off machine 510.

Since the winding layer 112 is laminated on the upper surface of the inner pipe 111 and then moved to the extrusion mold 610 and thus the outer pipe 113 is configured to be extruded on the upper surface of the winding layer 112, the outer pipe 113 is configured to be moved to an outer pipe 113 cooling mold 620 for cooling the extruded outer pipe 113.

As described above, since the first cowl crossbeam 110a and the second cowl crossbeam 110b according to the present disclosure are composed of the inner pipe 111, the winding layer 112, and the outer pipe 113, the outer pipe 113 is configured so that the outer circumferential surface of the outer pipe 113 extruded is changed as the shape of the extrusion mold 610 is changed. In one form of the present disclosure, the outer circumferential surface of the second cowl crossbeam 110b is configured so that the outer pipe 113 is extruded to have the gear structure 114.

Figure 7:
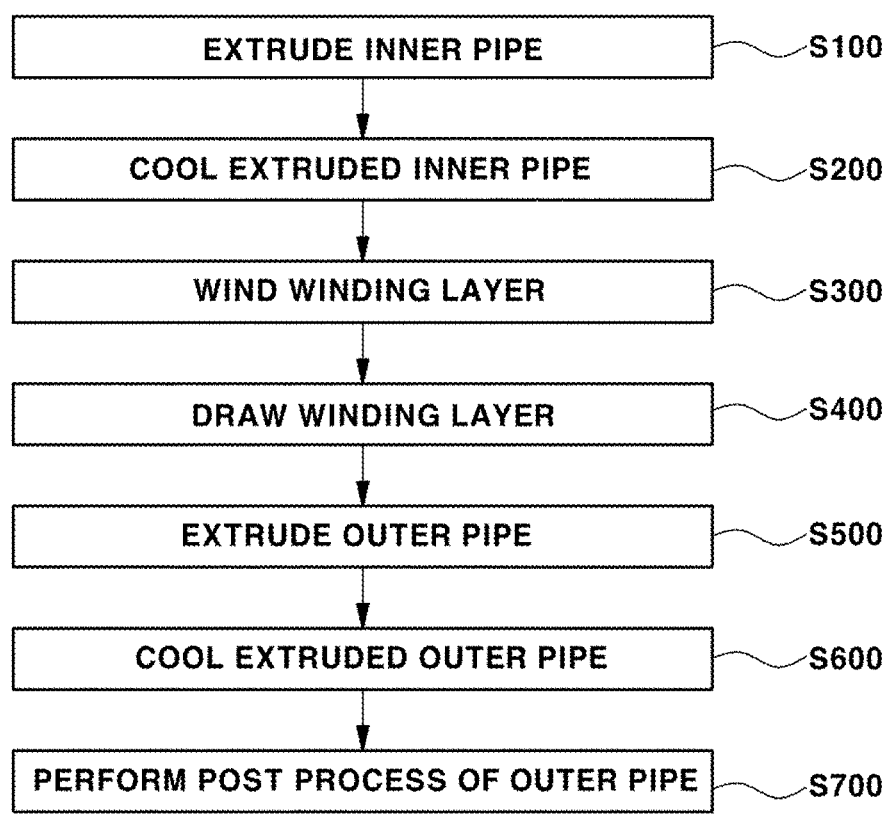
FIG. 7 is a flowchart illustrating a method for manufacturing the lightweight cowl crossbar, as an exemplary form of the present disclosure.

FIG. 7 is a flowchart illustrating a method for manufacturing the lightweight cowl crossbar 100, as an exemplary form of the present disclosure.

As an exemplary form of the present disclosure, a method for manufacturing the lightweight cowl crossbar 100 includes injecting a resin into the inner pipe extrusion mold 410 to extrude the inner pipe (S100). The inner pipe 111 thus extruded is subjected to cooling through the cooling mold 420 (S200).

In order to configure the winding layer 112 on the cooled inner pipe 111, glass fiber is configured to be wound as a composite material through the take-off machine 510 (S300). Since an exemplary form of the present disclosure configures four composite material layers, the configured winding layers 112 include first to fourth composite material layers.

Moreover, the planarization of the surface of the layer is performed through the drawing machine 520 after each of the composite material layers is laminated (S400).

After the winding layer 112 is laminated, the outer pipe 113 is configured to surround the upper surface of the winding layer 112 through the extrusion mold 610 (S500). Thereafter, the method performs cooling the outer pipe (S600) and performs a post process of the outer pipe 113 so that the support leg 120, the drawing block part 130, the steering column fastening part 140, and the like are fastened to the cowl crossbeam (S700).

In one form, the outer pipe 113 may be processed so that one surface facing the support leg 120, the drawing block part 130, and the steering column fastening part 140 forms a parallel surface, and configured to include a bolt hole or the like so that the support leg 120, the drawing block part 130, and the steering column fastening part 140 are fixed to the cowl crossbeam.

Figure 8:
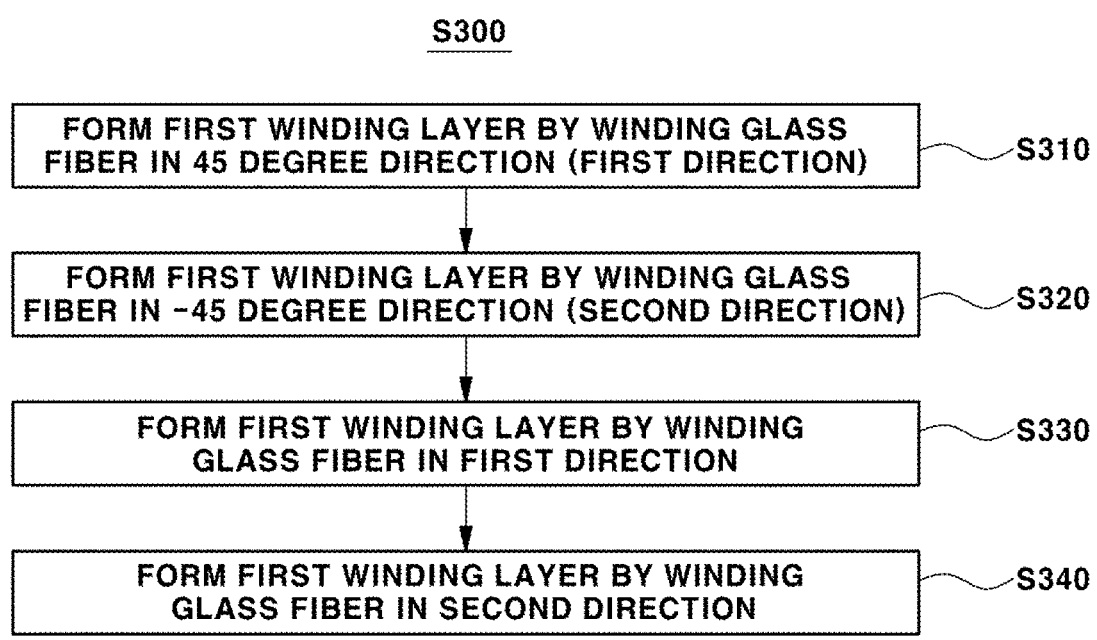
FIG. 8 is a flowchart illustrating a method for manufacturing a winding layer composed of four composite material layers, as an exemplary form of the present disclosure.

FIG. 8 illustrates, as a flowchart, forming the winding layer 112, as an exemplary form of the present disclosure.

As an exemplary form of the present disclosure, in laminating the winding layer composed of four layers, the first composite material layer is configured to be wound around the outer pipe 113 to have a predetermined angle in the first direction with respect to the width of the cowl crossbar 100 (S310). In an exemplary form of the present disclosure, the first direction may be at an angle of 45 degrees with respect to the width direction of the cowl crossbar 100. After the first composite material layer is wound, the planarization of the first composite material layer is performed through the drawing machine 520, and the second composite material layer is wound to be laminated on the planarized first composite material layer in the second direction. In one form, the second direction may be set to an angle of −90 degrees with respect to the first direction (S320).

After the second composite material layer is laminated, the upper surface of the second composite material layer is planarized through the drawing machine 520, and the third composite material layer is laminated on the upper surface of the second composite material layer in the same direction as the first direction (S330). After the third composite material layer is laminated, a drawing operation is performed, and the fourth composite material layer is laminated on the upper surface of the third composite material layer (S340).

In another exemplary form of the present disclosure, the directions formed by the composite materials forming the first composite material layer to the fourth composite material layer, respectively may be different from each other, and in still another exemplary form of the present disclosure, at least two composite material layers may be wound in the same direction.

The above detailed descriptions illustrate the present disclosure. In addition, the aforementioned contents illustrate and describe exemplary forms of the present disclosure, and the present disclosure may be used in various other combinations, modifications, and environments. That is, the present disclosure may be changed or modified within the scope of the concept of the disclosure disclosed in the present specification, the scope equivalent to the described disclosure, and/or the scope of the technology or knowledge in the art. The described exemplary forms describe the best mode for implementing the technical spirit of the present disclosure, and various changes required in specific application fields and uses of the present disclosure are possible. Accordingly, the above detailed descriptions of the disclosure are not intended to limit the present disclosure to the disclosed exemplary forms. In addition, the appended claims should be construed to also include other exemplary forms.

What is claimed is:

1. A lightweight cowl crossbar comprising:
   an inner pipe located inside a cowl crossbeam;
   a winding layer formed along an outer surface of the inner pipe, wherein an uneven section of the winding layer is planarized using a drawing machine; and
   an outer pipe located on an upper surface of the winding layer,
   wherein the cowl crossbeam includes;
      a first cowl crossbeam and a second cowl crossbeam,
      a support leg located on the second cowl crossbeam, and
      a drawing block part including an absorption member and configured to surround the outer pipe of the first cowl crossbeam in a region where the first cowl crossbeam and the second cowl crossbeam overlap each other,
   wherein the support leg is configured to be fastened to the first cowl crossbeam integrally with the second cowl crossbeam, and one surface of the support leg includes a hollow part, and
   wherein the absorption member has a hollow shape corresponding to the hollow part.

2. The lightweight cowl crossbar of claim 1, wherein the winding layer is made of a single-oriented fiber composite material.

3. The lightweight cowl crossbar of claim 1, wherein the winding layer is made of at least two single-oriented fibers having different angles.

4. The lightweight cowl crossbar of claim 1, wherein the outer pipe is configured to have a sawtooth shape.

5. The lightweight cowl crossbar of claim 1, wherein at least a part of the outer surface of the cowl crossbeam comprises a flat region.

\* \* \* \* \*